(12) United States Patent
Gao et al.

(10) Patent No.: US 12,143,250 B2
(45) Date of Patent: Nov. 12, 2024

(54) OPTICAL INTERCONNECT SYSTEM AND METHOD FOR DATA CENTER

(71) Applicant: SOOCHOW UNIVERSITY, Suzhou (CN)

(72) Inventors: Mingyi Gao, Suzhou (CN); Junchi Ke, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 11 days.

(21) Appl. No.: 18/196,531

(22) Filed: May 12, 2023

(65) Prior Publication Data

US 2023/0412433 A1   Dec. 21, 2023

Related U.S. Application Data

(63) Continuation of application No. PCT/CN2022/110581, filed on Aug. 5, 2022.

(30) Foreign Application Priority Data

Jun. 21, 2022  (CN) .......................... 202210704157.7

(51) Int. Cl.
*H04L 25/06* (2006.01)
*H04L 25/03* (2006.01)
*H04L 27/36* (2006.01)

(52) U.S. Cl.
CPC ...... *H04L 25/062* (2013.01); *H04L 25/03267* (2013.01); *H04L 27/368* (2013.01)

(58) Field of Classification Search
CPC ............. H04L 25/062; H04L 25/03267; H04L 27/368; H04L 25/4917; H04L 25/4975
See application file for complete search history.

(56) References Cited

U.S. PATENT DOCUMENTS 10,135,540 B2 * 11/2018 Medra ................. H04B 10/516
2012/0250785 A1 * 10/2012 Vidal .................. H03M 13/251
375/295

(Continued)

FOREIGN PATENT DOCUMENTS

CN         102598523 A      7/2012
CN         105162721 A      12/2015
(Continued)

*Primary Examiner* — David S Huang
(74) *Attorney, Agent, or Firm* — SZDC Law PC

(57) ABSTRACT

The invention provides an optical interconnect system and method for a data center. A nonlinear differential precoding module performs nonlinear differential precoding on an inputted original signal, to obtain a precoded signal with an increased quantity of levels. A generalized Tomlinson-Harashima precoding (GTHP) module pre-equalizes the precoded signal, to obtain a pre-equalized signal with scattered distribution. A faster than Nyquist (FTN) module performs high-frequency truncation filtering on the pre-equalized signal, to obtain a discrete signal. A signal transmission module transmits the discrete signal from a transmitting end to a receiving end. A feed-forward equalizer (FFE) performs strong equalization on the discrete signal to obtain a level slice signal, and decodes the level slice signal according to a GTHP decoding table, to obtain a decoded signal. A simplified 2D constellation distortion module processes the decoded signal to reshape a constellation, and obtains a restored signal according to a time interleaving method.

10 Claims, 7 Drawing Sheets

(56) References Cited

U.S. PATENT DOCUMENTS

2016/0056869 A1 2/2016 Tian et al.
2017/0310373 A1* 10/2017 Jana .................. H04L 25/03343

FOREIGN PATENT DOCUMENTS

| CN | 108173790 A | 6/2018 |
| CN | 109039472 A | 12/2018 |
| CN | 113132014 A | 7/2021 |

* cited by examiner (a)　　　　　　　　　　　(b)

(a) (b)

OPTICAL INTERCONNECT SYSTEM AND METHOD FOR DATA CENTER

This application is a Continuation Application of PCT/CN2022/110581, filed on Aug. 5, 2022, which claims priority to Chinese Patent Application No. 202210704157.7, filed on Jun. 21, 2022, which is incorporated by reference for all purposes as if fully set forth herein.

FIELD OF THE INVENTION

The present invention relates to the field of data communication technologies, and in particular to an optical interconnect system and a method for a data center.

DESCRIPTION OF THE RELATED ART

With the rapid development of communication technology, new technologies such as virtual reality (VR), cloud computing, cloud storage, and the internet of things are emerging. The dramatic growth of data traffic within a data center and between data centers has increased the demand for ultra-high-speed short-range fiber optic communication. An intensity modulation/direct detection (DD) pulse amplitude modulation (PAM) system with simple architecture and low cost are highly preferred in high-speed short-range fiber optic links. However, although high-order PAM signals can enhance the communication capacity of the system, the damage of the system to high-level signals severely deteriorates the bit error ratio (BER) performance of the system. Therefore, PAM-4 signals are more suitable for practical applications than PAM-6 and PAM-8 signals.

In addition, due to the bandwidth limitation of optoelectronic devices, the rates of communication systems can hardly satisfy the increasing capacity demand.

SUMMARY OF THE INVENTION

For this, a technical problem to be resolved by the present invention is to overcome the technical defect in the prior art that due to the bandwidth limitation of optoelectronic devices, the rates of communication systems can hardly satisfy the increasing capacity demand.

To resolve the foregoing technical problems, the present invention provides an optical interconnect system for a data center, including:

- a nonlinear differential precoding module, where the nonlinear differential precoding module performs nonlinear differential precoding on an inputted original signal, to obtain a precoded signal with an increased quantity of levels;
- a generalized Tomlinson-Harashima precoding (GTHP) module, where THP in the GTHP module is a single-tap simplified model, and the GTHP module pre-equalizes the precoded signal with an increased quantity of levels, to obtain a pre-equalized signal with scattered distribution;
- a faster than Nyquist (FTN) module, where the FTN module performs high-frequency truncation filtering on the pre-equalized signal with scattered distribution, to obtain a discrete signal;
- a signal transmission module, where the signal transmission module transmits the discrete signal from a transmitting end to a receiving end;
- an FFE, where the FFE performs strong equalization on the discrete signal to obtain a level slice signal, and decodes the level slice signal according to a GTHP decoding table, to obtain a decoded signal; and
- a simplified 2D constellation distortion (S2DCD) module, where the S2DCD module processes the decoded signal to reshape a constellation, and obtains a restored signal according to a time interleaving method, where the S2DCD module discards a noise parameter for which calculation requires participation of a feedback decision signal, and reserves an amplitude modulation parameter, where the nonlinear differential precoding module, the GTHP module, and the FTN module are disposed at the transmitting end, and the FFE and the S2DCD module are disposed at the receiving end.

Preferably, a coding scheme of the nonlinear differential precoding module includes:

$$\tilde{u}_n = \mathrm{mod}[u_n - \mathrm{floor}(\alpha v_{n-1}), m]$$

$$v_n = \tilde{u}_n + \mathrm{floor}(\alpha v_{n-1})$$

$$u_n = \mathrm{mod}(v_n, m),$$

where $u_n$ is an $n^{th}$ PAM-m symbol, $u_n \in \{0, 1, \ldots, m-1\}$, $\tilde{u}_n$ is an $n^{th}$ precoding symbol, $\tilde{u}_n \in \{0, 1, \ldots, m-1\}$, $v_n$ is an $n^{th}$ coding symbol, $v_n \in \{0, 1, \ldots, m-1\}$, a parameter $\alpha$ is a cutoff coefficient with a value ranging from 0 to 1, m and M are respectively level series of a PAM-m symbol before coding and a PAM-M symbol after coding, and Floor(•) is a rounding down function; and a power spectral density of a transfer function is:

$$S(\omega) = (1-\alpha)^2/1+\alpha^2-2\alpha \cos \omega T.$$

Preferably, the GTHP module performs nonlinear transform according to a look-up table (LUT), including:

- determining an output $s_n$ of the LUT by current values of $x_n$ and $u_n$, where $u_n$ is a sum of $x_n$ and an output feedback signal, and $x_n$ is an inputted PAM-M sequence; and
- adding the output $s_n$ of the LUT and $u_n$ to fold an out-of-range signal.

Preferably, the S2DCD module performs data processing based on the following method:

calculating a spatial relative offset of every 2D constellation point by using a predefined 2D function $F(x, y)$ for use in subsequent constellation shaping:

$$F(x, y) = \sum_{i=1}^{N} A e^{-\frac{((x-\mu_{xi}-\sigma_x^2)\sin\theta_i - (y-\mu_{yi}+\sigma_y^2)\cos\theta_i)^2}{2\sigma_y^2} - \frac{((y-\mu_{yi}+\sigma_y^2)\sin\theta_i + (x-\mu_{xi}-\sigma_x^2)\cos\theta_i)^2}{2\sigma_x^2}} - A e^{-\frac{((x-\mu_{xi}-\sigma_x^2)\sin\theta_i - (y-\mu_{yi}+\sigma_y^2)\cos\theta_i)^2}{2\sigma_y^2} - \frac{((y-\mu_{yi}+\sigma_y^2)\sin\theta_i + (x-\mu_{xi}-\sigma_x^2)\cos\theta_i)^2}{2\sigma_x^2}},$$

where N is a quantity of 2D constellation points, $N=2^M$ in a PAM-M signal, A denotes an amplitude of every 2D Gaussian distribution, $\mu_{xi}$ and $\mu_{yi}$ are a real part and an imaginary part of an $i^{th}$ constellation point, $\sigma_x^2$ and $\sigma_y^2$ are respectively variances of noise distribution along a real axis and an imaginary axis, and $\theta_i$ is a tilt angle of a first cluster of a received signal relative to a real axis of an IQ plane, and is approximated by using $\theta_i \approx \tan^{-1}(\sigma_{yi}^2/\sigma_{xi}^2)$;

discarding the noise parameter for which calculation requires participation of a feedback decision signal, and reserving an amplitude modulation parameter A, to obtain a simplified formula:

$$F(x, y) = \sum_{i=1}^{N} A e^{-\frac{(y-\mu_{yi}+x-\mu_{xi})^2}{2}} \left( e^{-\frac{(x-\mu_{xi}-y+\mu_{yi}-1)^2}{2}} - e^{-\frac{(x-\mu_{xi}-y-\mu_{yi}+1)^2}{2}} \right),$$

where an output R'[n] after 2D constellation distortion is:

$R'[n]=R[n]-F(x_n,y_n)+F(x_n,y_n)\cdot j$; and restoring an original PAM-M signal according to the time interleaving method.

Preferably, the method further includes:
a BER calculation module, where the BER calculation module compares the obtained restored signal with the original signal, to obtain a BER.

Preferably, each of the transmitting end and the receiving end is provided with an offline digital signal processing (DSP) module.

Preferably, the signal transmission module includes a fiber channel.

Preferably, the system is an optical interconnect system for a data center based on partial response THP high-speed data PAM-4.

Disclosed in the present invention is an optical interconnect method, implemented based on the foregoing optical interconnect system for a data center.

Preferably, an input signal of the nonlinear differential precoding module is PAM-4 data, and an output signal of the nonlinear differential precoding module is PAM-6 data.

Compared with the prior art, the foregoing technical solution of the present invention has the following advantages:

1. At a transmitting end, in one aspect of the present invention, a distance between symbol levels is adjusted by using GTHP to flexibly counteract inter-code interference. In another aspect, nonlinear differential coding (NLDC) is used to counteract high-frequency roll-off of a low bandwidth device, and at the same time an as small as possible quantity of levels is kept, to counteract nonlinear damage of a bandwidth-limited system.

2. At a receiving end, after equalization, a denoising module is usually used to mitigate the enhancement of color noise. However, a common denoising module has a complex DD-FTN structure, and is not applicable to a low-cost short-range bandwidth-limited system. Therefore, in the present invention, the impact of color noise is mitigated by using S2DCD, the algorithm is simpler, and an optimal effect can be achieved without complex nonlinear equalization.

Figure 3:
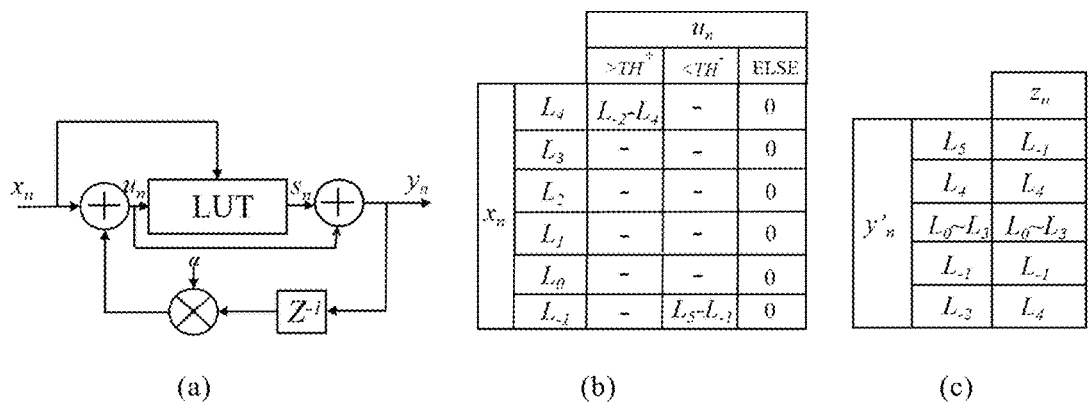
Figure 4:
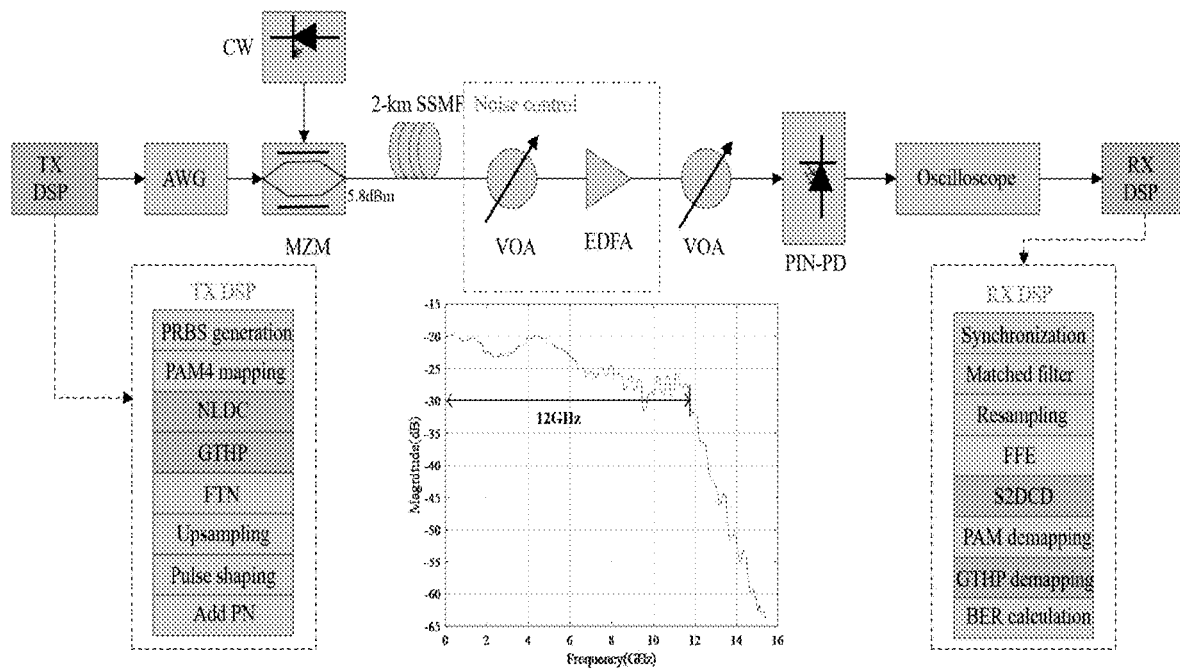
Figure 5:
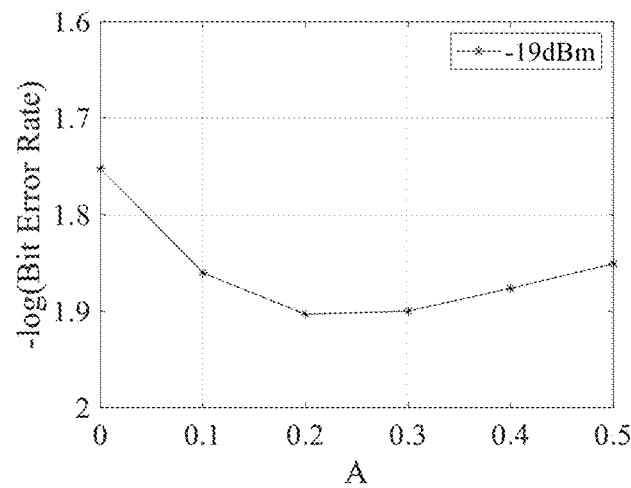
Figure 6:
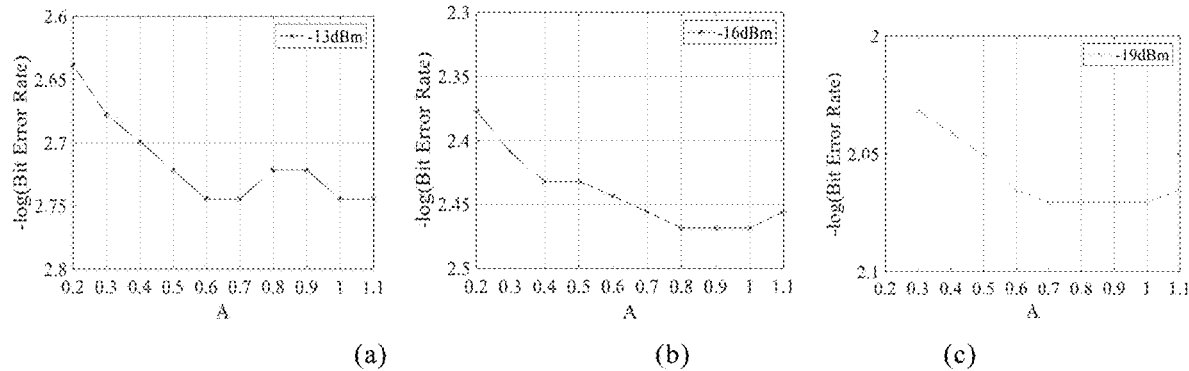
Figure 7:
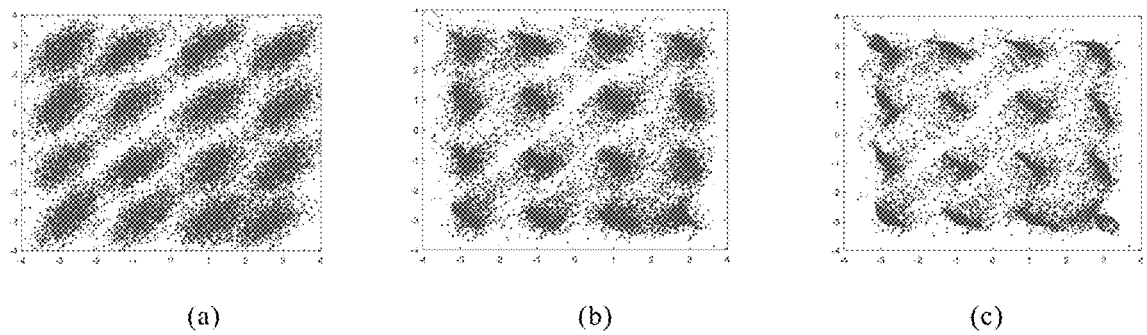
Figure 8:
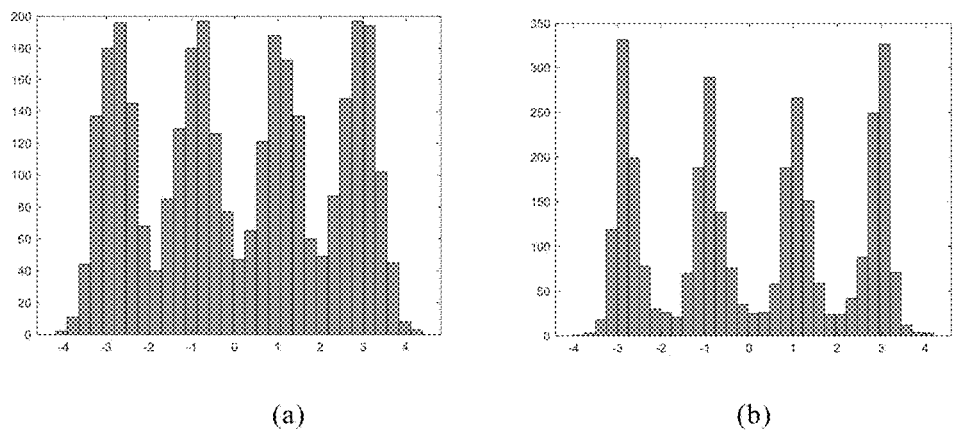
Figure 9:
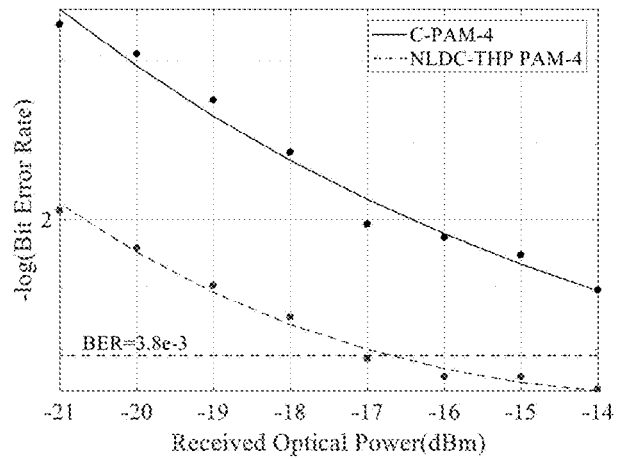
Figure 10:
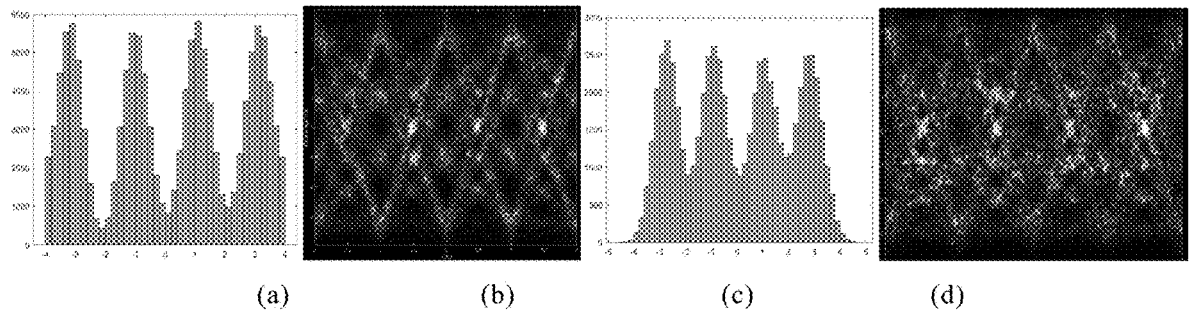
Figure 11:
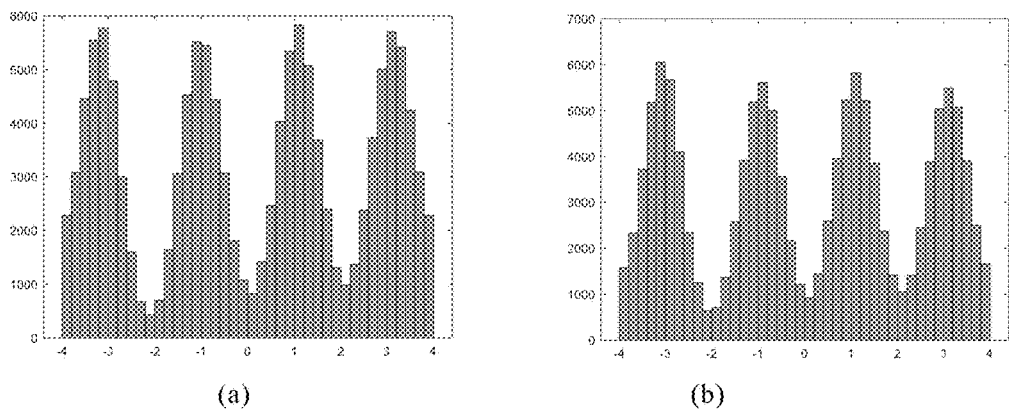
Figure 12:
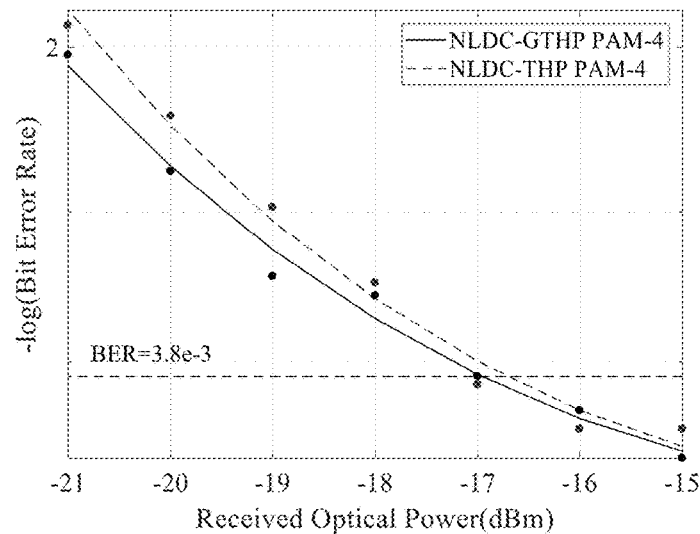
Figure 13:
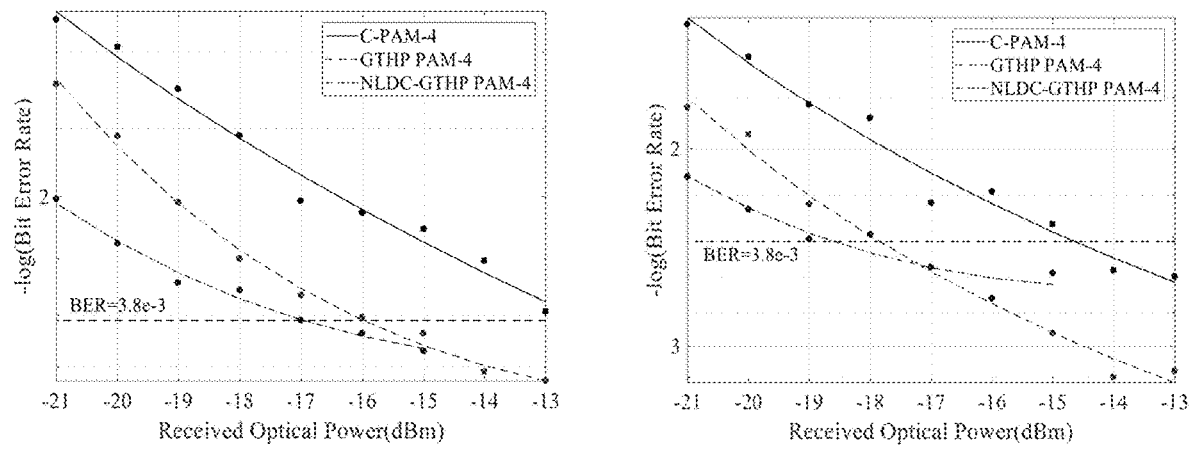
Figure 14:
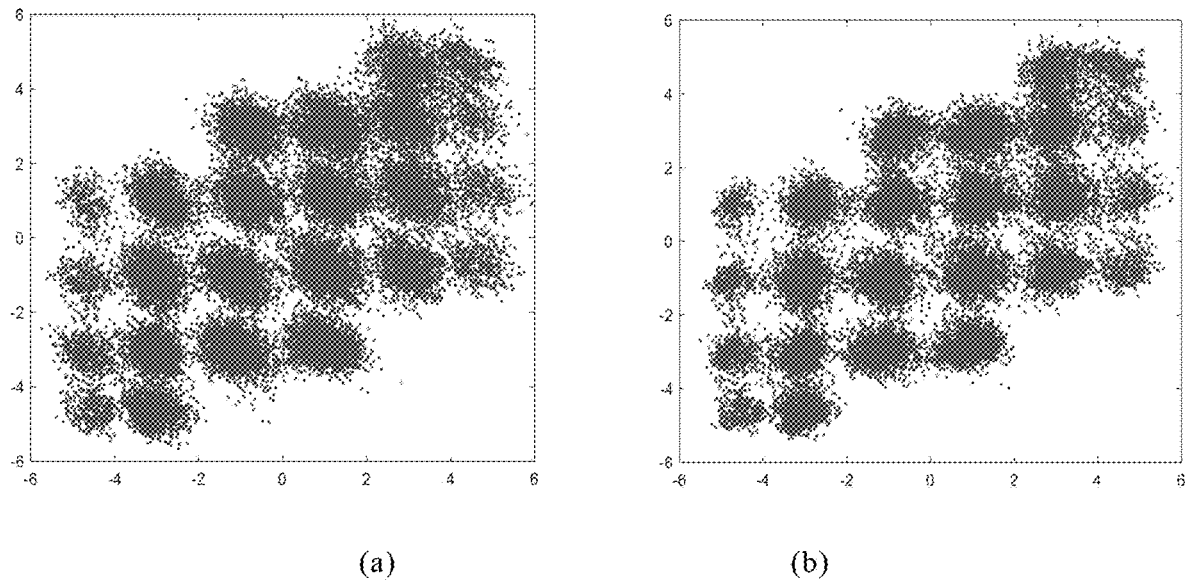
Figure 15:
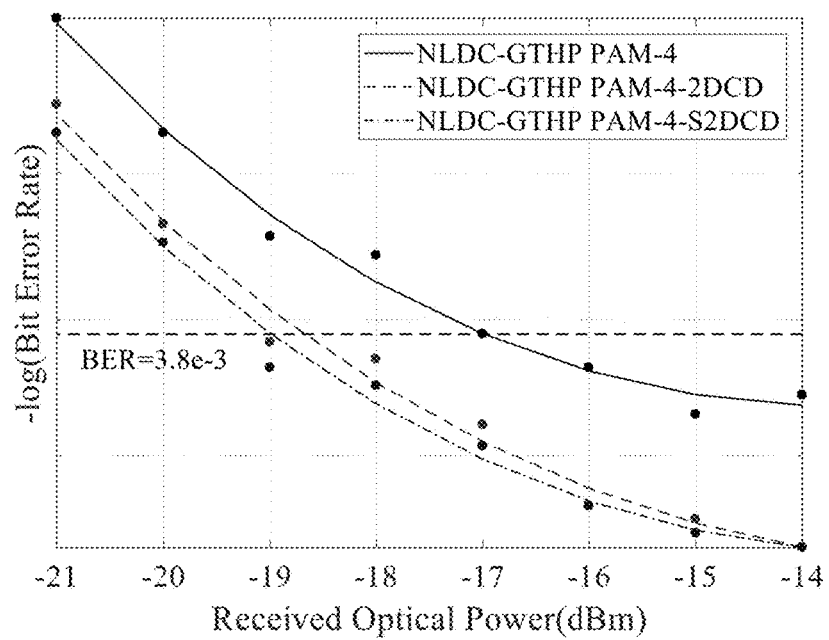
Figure 16:
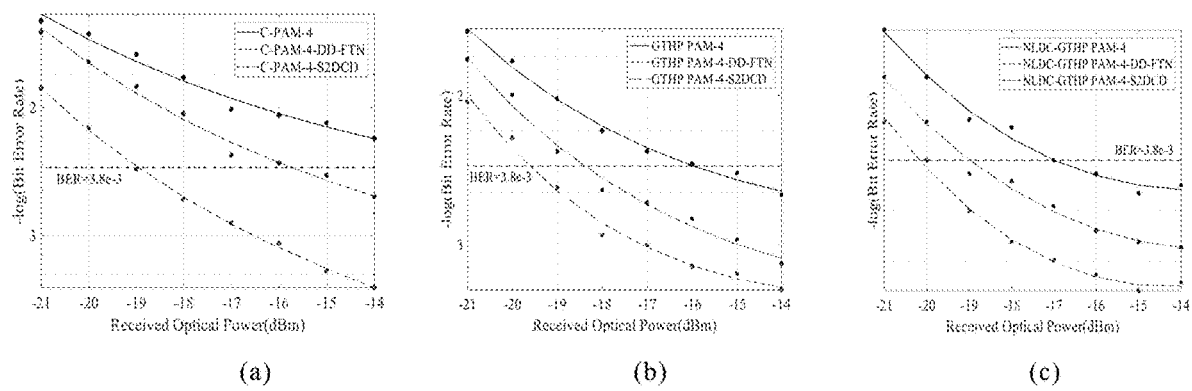

(a) of FIG. 3 is a schematic diagram of the principle of NLDC-GTHP PAM-4 coding, (b) shows a folding table of an NLDC-GTHP PAM-4 encoder, and (c) shows a decoding table of a receiving end of the NLDC-GTHP PAM-4 encoder;

FIG. 4 shows experimental settings of a 31.25-GBd NLDC-GTHP PAM-4 fiber transmission experiment; and the inset is a measured end-to-end channel response;

FIG. 5 is a curve graph of a BER changing with a GTHP tap coefficient;

FIG. 6 is a curve of a BER changing with an amplitude modulation coefficient A of 2D constellation distortion at different received optical powers (ROP): (a) −13 dBm, (b) −16 dBm, and (c) −19 dBm;

FIG. 7 is a schematic diagram of 2D constellations of an amplitude A in different cases, where (a) A=0, (b) A=0.5, and (c) A=0.7;

(a) of FIG. 8 is a histogram of a PAM-4 signal before S2DCD, and (b) of FIG. 8 is a histogram of a PAM-4 signal after S2DCD;

FIG. 9 is comparison diagram of transmission performance of a C-PAM-4 signal and an NLDC-THP PAM-4 signal;

(a) of FIG. 10 is a histogram of an NLDC-THP PAM-4 signal, (b) of FIG. 10 is an eye pattern of an NLDC-THP PAM-4 signal, (c) of FIG. 10 is a histogram of a C-PAM-4 signal, and (d) of FIG. 10 is an eye pattern of a C-PAM-4 signal;

FIG. 11 is a histogram of a signal after decoding, where (a) shows an NLDC-THP PAM-4, and (b) shows an NLDC-GTHP PAM-4 signal;

FIG. 12 is a diagram of transmission BERs of an NLDC-THP PAM-4 signal and an NLDC-GTHP PAM-4 signal;

FIG. 13 shows the impact of partial response coding on bit error rate performance of a GTHP system in different equalization method, where (a) shows equalization of an FFE, and (b) shows equalization of a Volterra nonlinear equalizer (VE);

FIG. 14 is a 2D diagram of an NLDC-GTHP PAM-4 system before decoding, where (a) shows the case before constellation distortion, and (b) shows the case after constellation distortion;

FIG. 15 is a curve graph of a BER of 2D constellation distortion processing and S2DCD processing; and FIG. 16 shows: (a) a C-PAM-4 system, (b) a GTHP PAM-4 system, and (c) the impact of S2DCD and DD-FTN in an NLDC-GTHP PAM-4 system on bit error rate performance of a system.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Referring to FIG. 1 to FIG. 16, disclosed in the present invention is an optical interconnect system for a data center, including a nonlinear differential precoding module, a GTHP module, an FTN module, a signal transmission module, an FFE, and an S2DCD module.

The nonlinear differential precoding module performs nonlinear differential precoding on an inputted original signal, to obtain a precoded signal with an increased quantity of levels. A coding scheme of the nonlinear differential precoding module includes:

$$\tilde{u}_n = \mathrm{mod}[u_n - \mathrm{floor}(\alpha v_{n-1}), m]$$

$$v_n = \tilde{u}_n + \mathrm{floor}(\alpha v_{n-1})$$

$$u_n = \mathrm{mod}(v_n, m)$$

where $u_n$ is an $n^{th}$ PAM-m symbol, $u_n \in \{0, 1, \ldots, m-1\}$, $\tilde{u}_n$ is an $n^{th}$ precoding symbol, $\tilde{u}_n \in \{0, 1, \ldots, m-1\}$, $v_n$ is an $n^{th}$ coding symbol, $v_n \in \{0, 1, \ldots, m-1\}$, a parameter $\alpha$ is a cutoff coefficient with a value ranging from 0 to 1, m and M are respectively level series of a PAM-m symbol before coding and a PAM-M symbol after coding, and Floor(•) is a rounding down function; and a power spectral density of a transfer function is:

$$S(\omega) = \frac{(1-\alpha)^2}{1+\alpha^2 - 2\alpha \cos \omega T}.$$

THP in the GTHP module is a single-tap simplified model, and the GTHP module pre-equalizes the precoded signal with an increased quantity of levels, to obtain a pre-equalized signal with scattered distribution. The GTHP module performs nonlinear transform according to a LUT includes: determining an output $s_n$ of the LUT by current values of $x_n$ and $u_n$, where $u_n$ is a sum of $x_n$ and an output feedback signal, and $x_n$ is an inputted PAM-M sequence; and adding the output $s_n$ of the LUT and $u_n$ to fold an out-of-range signal.

The FTN module performs high-frequency truncation filtering on the pre-equalized signal with scattered distribution, to obtain a discrete signal.

The signal transmission module transmits the discrete signal from a transmitting end to a receiving end.

The FFE performs strong equalization on the discrete signal to obtain a level slice signal, and decodes the level slice signal according to a GTHP decoding table, to obtain a decoded signal.

The S2DCD module processes the decoded signal to reshape a constellation, and obtains a restored signal according to a time interleaving method, where the S2DCD module discards a noise parameter for which calculation requires participation of a feedback decision signal, and reserves an amplitude modulation parameter.

Specifically, the S2DCD module performs data processing based on the following method:

calculating a spatial relative offset of every 2D constellation point by using a predefined 2D function F(x, y) for use in subsequent constellation shaping:

$$F(x, y) = \sum_{i=1}^{N} Ae^{-\frac{((x-\mu_{xi}-\sigma_x^2)\sin\theta_i - (y-\mu_{yi}+\sigma_y^2)\cos\theta_i)^2}{2\sigma_y^2}} e^{-\frac{((y-\mu_{yi}+\sigma_y^2)\sin\theta_i + (x-\mu_{xi}-\sigma_x^2)\cos\theta_i)^2}{2\sigma_x^2}} -$$

$$Ae^{-\frac{((x-\mu_{xi}-\sigma_x^2)\sin\theta_i - (y-\mu_{yi}+\sigma_y^2)\cos\theta_i)^2}{2\sigma_y^2}} e^{-\frac{((y-\mu_{yi}+\sigma_y^2)\sin\theta_i + (x-\mu_{xi}-\sigma_x^2)\cos\theta_i)^2}{2\sigma_x^2}},$$

where N is a quantity of 2D constellation points, $N=2^M$ in a PAM-M signal, A denotes an amplitude of every 2D Gaussian distribution, $\mu_{xi}$ and $\mu_{yi}$ are a real part and an imaginary part of an $i^{th}$ constellation point, $\sigma_x^2$ and $\sigma_y^2$ are respectively variances of noise distribution along a real axis and an imaginary axis, and $\theta_i$ is a tilt angle of a first cluster of a received signal relative to a real axis of an IQ plane, and is approximated by using $\theta_i \approx \tan^{-1}(\sigma_{yi}^2/\sigma_{xi}^2)$;

discarding the noise parameter for which calculation requires participation of a feedback decision signal, and reserving an amplitude modulation parameter A, to obtain a simplified formula:

$$F(x, y) = \sum_{i=1}^{N} Ae^{-\frac{(y-\mu_{yi}+x-\mu_{xi})^2}{2}} \left( e^{-\frac{(x-\mu_{xi}-y+\mu_{yi}-1)^2}{2}} - e^{-\frac{(x-\mu_{xi}-y-\mu_{yi}+1)^2}{2}} \right),$$

where an output R'[n] after 2D constellation distortion is:

$$R'[n] = R[n] - F(x_n, y_n) + F(x_n, y_n) \cdot j; \text{ and}$$

restoring an original PAM-M signal according to the time interleaving method.

The nonlinear differential precoding module, the GTHP module, and the FTN module are disposed at the transmitting end, and the FFE and the S2DCD module are disposed at the receiving end.

The present invention further includes a BER calculation module. The BER calculation module is disposed at an output end of the S2DCD module. The BER calculation module compares the obtained restored signal with the original signal, to obtain a BER.

In the present invention, each of the transmitting end and the receiving end is provided with an offline DSP module.

The signal transmission module includes a fiber channel.

Preferably, the system in the present invention is an optical interconnect system for a data center based on partial response THP high-speed data PAM-4.

Further disclosed in the present invention is an optical interconnect method, implemented based on the foregoing optical interconnect system for a data center. Specifically, an input signal of the nonlinear differential precoding module is PAM-4 data, and an output signal of the nonlinear differential precoding module is PAM-6 data.

A specific implementation of the present invention is further described below.

With the rapid development of communication technology, new technologies such as VR, cloud computing, cloud storage, and the internet of things are emerging. The dramatic growth of data traffic within a data center and between data centers has increased the demand for ultra-high-speed short-range fiber optic communication. An intensity modulation/DD PAM system with simple architecture and low cost are highly preferred in high-speed short-range fiber optic links. However, although high-order PAM signals can enhance the communication capacity of the system, the damage of the system to high-level signals severely deteriorates the BER performance of the system. Therefore, PAM-4 signals are more suitable for practical applications than PAM-6 and PAM-8 signals.

In addition, due to the bandwidth limitation of optoelectronic devices, the rates of communication systems can hardly satisfy the increasing capacity demand. To implement high-speed signal transmission over fixed bandwidth systems, FTN provides an effective solution. However, the signal waveform distortion brought by FTN may cause severe intersymbol interference (BD. To mitigate signal damage, efficient DSP is often required at a transmitter and a receiver. Equalizer and partial response preprocessing techniques may be used to enhance the robustness of PAM-4 signals to counteract high frequency fading. An FFE and a decision feedback equalizer (DFE) are the commonly used conventional equalization schemes. Scholars have proposed a correlation training sequence to accelerate the least-mean-square (LMS) based equalization in bandwidth-limited IM/DD systems, and 43-GBd PAM-4 signal 5-km and 10-km standard single mode fiber (SSMF) transmission has been implemented in a 6-dB bandwidth 10 GHz fiber transmission system. Some researchers have implemented 50-GBd PAM4 signal back-to-back and 10-km transmission in the 3-dB bandwidth 10 GHz fiber transmission system by using a cascaded multimode algorithm, a multi-tap VE, and a decision-directed LMS method. However, the joint algorithm has high overall complexity and large number of equalizer taps, and it is difficult to implement the joint algorithm.

The present invention proposes an NLDC-GTHP system. In the present invention, in one aspect, a distance between symbol levels is adjusted by using GTHP. In another aspect, NLDC is used to keep an as small as possible quantity of levels, thereby mitigating the nonlinear damage of system. In addition, in the present invention, an S2DCD module is further configured to reduce color noise introduced by the equalizer. The system has a simple algorithm at a receiving end, and an obvious effect of mitigating a bit error rate can be obtained without performing complex nonlinear equalization. Finally, the present invention experimentally verifies the effectiveness of a proposed NLDC-GTHP scheme, which implements the transmission of 62.5-Gb/s PAM-4 signals in 2-km SSMF over a 10-dB 12-GHz bandwidth system. The transmission performance of the signals is better than that of conventional THP PAM-4 signals. Compared with only using a conventional linear equalizer, the addition of S2DCD can improve the receiving sensitivity by approximately 2-dB at a hard-decision-forward error correction (HD-FEC) BER threshold.

Figure 1:
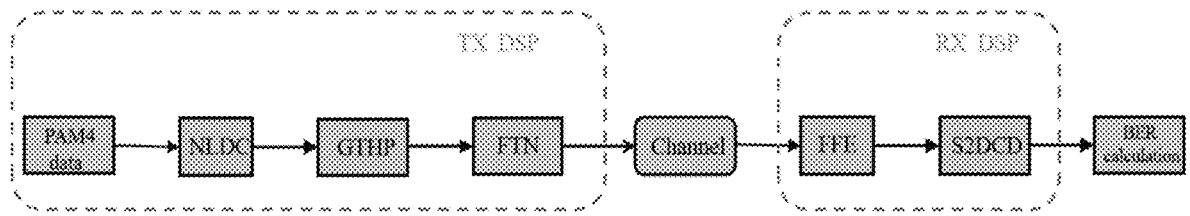
FIG. 1 is a schematic structural diagram of an optical interconnect system for a data center according to the present invention.
Figure 2:
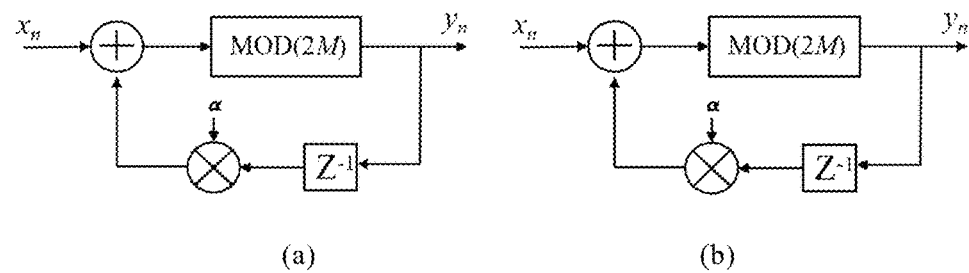
FIG. 2 is a structural block diagram of THP, where (a) is a structural block diagram of THP, and (b) is a block diagram of single-tap simplified THP.

The working principle of the present invention is as follows:

A structural diagram of the NLDC-GTHP system is shown in FIG. 1. In the present invention, nonlinear differential precoding is first performed in the transmitter, and a coding method of the nonlinear differential precoding is shown in Formula (1):

$$\tilde{u}_n = \mathrm{mod}[u_n - \mathrm{floor}(\alpha v_{n-1}), m]$$

$$v_n = \tilde{u}_n + \mathrm{floor}(\alpha v_{n-1})$$

$$u_n = \mathrm{mod}(v_n, m) \qquad (1),$$

where $u_n$ is an $n^{th}$ PAM-m symbol, $u_n \in \{0, 1, \ldots, m-1\}$, an is an $n^{th}$ precoding symbol, $\tilde{u}_n \in \{0, 1, \ldots, m-1\}$, $v_n$ is an $n^{th}$ coding symbol, and $v_n \in \{0, 1, \ldots, m-1\}$. A parameter $\alpha$ is a cutoff coefficient with a value ranging from 0 to 1. m and M are respectively level series of a PAM-m symbol before coding and a PAM-M symbol after coding. Floor(•) is a rounding down function, and may be understood as adding or subtracting an integer in a coding calculation process. The integer does not affect the overall frequency response. Therefore, a coding process is equivalent to a 1-tap infinite impulse response filter, a tap coefficient is $\alpha$, and power spectral density of a transfer function is shown in Formula (2):

$$S(\omega) = \frac{(1-\alpha)^2}{1+\alpha^2 - 2\alpha \cos \omega T}. \qquad (2)$$

In the present invention, $\alpha=0.5$ is chosen, and m and M are respectively 4 and 6. That is, a precoding process is conversion from a PAM-4 symbol into a PAM-6 symbol.

Next, GTHP precoding is performed. In fact, a conventional THP-PAM coding process is shown in Formula (3):

$$y_n = \mathrm{mod}_{2M}\{x_n + [1-H(z)]*y_n\} \qquad (3), \text{ and}$$

$$z_n = \mathrm{mod}_{2M}(y_n') \qquad (4),$$

where $x_n$ is an inputted PAM-M sequence, $y_n$ is a coding output, H(z) is a channel response function, and * is a convolution operation. When the amplitude of $y_n$ exceeds a given value interval, $y_n$ is folded back by a modular function (a range of 2M). At the receiving end, a detected signal $y_n'$ is inputted into one modular function (a range of 2M) for use as a THP decoder, to restore an original PAM-M signal. A sending end model of THP is shown in (a) of FIG. 2, and during actual use, a channel transfer function H(z) needs to be accurately measured. To facilitate implementation and simplify an overall structure, a single-tap simplified model may be selected for THP, as shown in (b) of FIG. 2.

FIG. 3 is a schematic diagram of the principle of precoding a GTHP PAM-4 signal. Compared with a THP solution, GTHP may set level and modulus ranges to any values, and signal constellation points are flexibly set. (a) of FIG. 3 shows a simplified model of a GTHP encoder used in an NLDC-GTHP system. Instead of a modular function, a LUT in (b) of FIG. 3 is used to perform nonlinear transform, where the selection of level sets $L_{-2}$ to $L_5$ affects the function of a LUT. An output $s_n$ of the LUT is determined by current values of $x_n$ and $u_n$, and $u_n$ is a sum of $x_n$ and an output feedback signal. The output $s_n$ of the LUT and $u_n$ are then added, to fold an out-of-range signal. To simplify decoding in a receiver, multi-level signal decision making is first applied, and then an original PAM-4 signal is restored by using a GTHP decoder. If uniform distances are used in the selection of a level set, a modular function may be used as the GTHP decoder. However, if distances are not uniform, a simple unfolding table in (c) of FIG. 3 may be used as the decoder to move an extended signal level back to an original position.

The foregoing equalization method can reduce high-frequency roll-off caused by ISI and compensational bandwidth limitation. However, during equalization of a signal, an additive white Gaussian noise (AWGN) is also converted into color noise. It is assumed that a transmitted signal of a channel response h(t) is s(t), and a received signal q(t) may be written as:

$$q(t)=s(t)*h(t)+n(t) \qquad (5),$$

where n(t) is an AWGN component in a channel, * is a convolution operation, and h(t) may be considered as a low-pass filter due to a low-pass characteristic thereof. Therefore, an equalization operation is crucial to the restoration of a high-frequency component of the transmitted signal and elimination of ISI. If a transfer function of an equalizer is e(t), an output of the transfer function may be denoted as:

$$q_e(t)=q(t)*e(t)=s(t)*h(t)*e(t)+n(t)*e(t) \qquad (6).$$

It is assumed that ISI is thoroughly removed after equalization in an optimal case. That is, a result of e(t) and h(t) after convolution is 1. In this case, $q_e(t)$ may be written as:

$$q_e(t)=s(t)+n(t)*e(t) \qquad (7).$$

It can be seen that because of a high-pass filtering effect of e(t), in addition to the transmitted signal, the received signal after optimal equalization further includes in-band noise enhanced by the equalizer, and the noise is usually referred to as color noise. The occurrence of color noise makes noise of the receiver present a non-Gaussian distribution characteristic. 2D constellation distortion may perform 2D visualization on color noise in a 1D PAM-4 signal.

2D constellation distortion generates a 2D signal through time interleaving, that is, $x_n=x[2_n-1]$ and $y_n=x[2_n]$, and a time interleaving complex number signal is $R[n]=x_n+y_n j$ is used as a received symbol. A constellation group PAM signal formed through time interleaving has an obvious asymmetry phenomenon, which is caused by in-band enhanced color noise. An enhancement level of noise is directly proportional to an equalization depth of the equalizer.

In a 2D constellation distortion method, a constellation may be reshaped to minimize the impact of color noise, thereby reducing a BER of the system. Advantages of the method lie in that a 2D constellation with interleaving 2D function correction time is used, and the structure of the entire constellation diagram and determination thresholds are not changed. However, the 2D constellation distortion method has high calculation complexity and a constellation shaping effect is not obvious enough, leading to a limited improvement in the BER. The present invention reduces the calculation complexity, and optimizes the overall performance by optimizing an amplitude modulation parameter.

In the present invention, a spatial relative offset of every 2D constellation point is first calculated by using a predefined 2D function $F(x, y)$ for use in subsequent constellation shaping:

$$F(x, y) = \sum_{i=1}^{N} Ae^{-\frac{((x-\mu_{xi}-\sigma_x^2)\sin\theta_i-(y-\mu_{yi}+\sigma_y^2)\cos\theta_i)^2}{2\sigma_y^2}} e^{-\frac{((y-\mu_{yi}+\sigma_y^2)\sin\theta_i+(x-\mu_{xi}-\sigma_x^2)\cos\theta_i)^2}{2\sigma_x^2}} - Ae^{-\frac{((x-\mu_{xi}-\sigma_x^2)\sin\theta_i-(y-\mu_{yi}+\sigma_y^2)\cos\theta_i)^2}{2\sigma_y^2}} e^{-\frac{((y-\mu_{yi}+\sigma_y^2)\sin\theta_i+(x-\mu_{xi}-\sigma_x^2)\cos\theta_i)^2}{2\sigma_x^2}},$$  (8)

where N is a quantity of 2D constellation points ($N=2^M$ in a PAM-M signal). A denotes an amplitude of every 2D Gaussian distribution, $\mu_{xi}$ and $\mu_{yi}$ are a real part and an imaginary part of an $i^{th}$ constellation point, and $\sigma_x^2$ and $\sigma_y^2$ are respectively variances of noise distribution along a real axis and an imaginary axis. $\theta_i$ is a tilt angle of a first cluster of a received signal relative to a real axis of an IQ plane, and is approximated by using $\theta_i \approx \tan^{-1}(\sigma_{yi}^2/\sigma_{xi}^2)$. Because NLDC has increased a quantity of levels, a quantity of constellation clouds is obviously increased after 2D treatment, and the complexity is also increased accordingly. To simplify the system, a noise related parameter for which calculation requires participation of a feedback decision signal may be discarded, and only an amplitude modulation parameter A is reserved. A simplified formula is as follows:

$$F(x, y) = \sum_{i=1}^{N} Ae^{-\frac{(y-\mu_{yi}+x-\mu_{xi})^2}{2}} \left( e^{-\frac{(x-\mu_{xi}-y+\mu_{yi}-1)^2}{2}} - e^{-\frac{(x-\mu_{xi}-y-\mu_{yi}+1)^2}{2}} \right).$$  (9)

An output $R'[n]$ after 2D constellation distortion is as follows:

$$R'[n]=R[n]-F(x_n,y_n)+F(x_n,y_n)\cdot j$$  (10).

An original PAM-M signal may be restored according to the time interleaving method.

FIG. 4 is a structural diagram of a 31.25-GBd NLDC-GTHP PAM-4 fiber transmission experiment. At a transmitter, PAM-4 mapping is first performed on a pseudo-random binary sequence (PRBS), and a uniform PAM-4 symbol is generated after binary bits are mapped. An NLDC-GTHP encoder includes one NLDC encoder and one GTHP encoder, which respectively perform partial response precoding and pre-equalization on data at a sending end. A conventional PAM-4 system may skip the NLDC-GTHP encoder, and directly make a signal pass through an FTN acceleration module with an acceleration factor of 0.8. Then, a symbol sequence is upsampled into two samples per symbol (sps). Subsequently, a root raised cosine (RRC) finite impulse response filter with a roll-off coefficient of 0.3 is used to perform impulse shaping. When the roll-off coefficient of the RRC filter is smaller, the spectral efficiency of signals is higher. However, it is difficult to implement an excessively small roll-off coefficient in actual engineering, and ISI is also severer when linear distortion occurs in a transmission process. The roll-off coefficient is usually set between 0.15 and 0.5. Finally, one pseudonoise (PN) sequence is then inserted to perform symbol synchronization at a receiving end. Then, data in offline DSP processing at a transmitting end is loaded into one arbitrary waveform generator (AWG). A 3-dB bandwidth of the AWG is approximately 11-GHz, a maximum sampling rate is 50 GSa/s, and a baud rate of a PAM-4 transmitted signal may be adjusted by changing a sampling rate of the AWG. An electrical signal outputted by the AWG is modulated into continuous optical signals through a Mach-Zehnder modulator (MZM), a wavelength of an optical signal is 1550.116 nm, and the power of an optical signal outputted by the modulator is 5.8 dBm. The outputted signal is transmitted over a 2-km SSMF, and a short-range optical interconnect application scenario of a data center is simulated. To compare the performance of different algorithms, in the experiment, a cascaded method of a variable optical attenuator (VOA) and an erbium-doped fiber amplifier (EDFA) is used to control a signal noise level, thereby testing the BER performance of a system. In an actual system, the testing part may be directly skipped. Due to a linear relationship between an input optical power of the EDFA and an optical signal-to-noise ratio of the signal, the input optical power of the EDFA may be used as a ROP to depict a curve of a BER. Finally, one VOA is configured to adjust an optical power inputted into a PIN-PD, where a 3-dB bandwidth of PD is 10-GHz, end-to-end frequency response curves are shown in the inset in FIG. 4, and the 10-dB bandwidth of the system is 12 GHz. The receiving end uses a real-time oscilloscope (RTO) to acquire an electrical signal outputted by the PD, and a sampling rate is 50 GSa/s. Received data is first processed by using a synchronization algorithm. Then, the signal is resampled into 1 sps, and after matching and filtering by using an RRC matching filter, an FFE equalizer is introduced to restore an original signal. Next, an S2DCD operation is performed on the equalized signal to eliminate color noise. Finally, a 2D signal is converted into a 1D PAM-4 signal to directly perform hard-decision making, then decoding is performed according to a GTHP decoding table, and a BER of a signal is calculated. For the conventional PAM-4 system, a GTHP decoding module may be skipped.

Experimental results of the present invention are as follows.

A. NLDC-THP Parameter Optimization

First, a tap coefficient in a single-tap simplified model of GTHP has significant impact on a BER of a PAM-4 system. FIG. 5 shows a curve of a BER changing with a GTHP tap coefficient. In the experiment, a symbol rate of uniform PAM-4 signals is set to 31.25-GBd, and a ROP is set to −20 dBm. It can be seen from FIG. 5 that when the value of the coefficient is small, a mitigation effect of the BER of the GTHP is not obvious. However, when the value of the coefficient is excessively large, an obvious overcorrection phenomenon occurs. Therefore, there is an optimal tap coefficient. In the system, the tap coefficient is mainly affected by a channel response. As shown in Formula (3), when a transmission rate of the system is higher, a transmission distance is longer, and channel damage is severer, and a larger optimal tap coefficient is required. An experimental result indicates that the optimal tap coefficient in the system is 0.2. The GTHP tap coefficient is set to 0.2 in all the following experiments.

In addition, an amplitude modulation coefficient A in a 2D constellation distortion module also has obvious impact on the BER of the PAM-4 system. FIG. 6 shows respectively curve graphs of BERs of one 31.25-GBd PAM-4 signal after S2DCD in three different ROPs (ROP=−13/−16/−19 dBm). Obvious mitigation of the BER can be observed by changing the amplitude modulation coefficient A. As A gradually increases, a 2D constellation diagram of the PAM-4 signal gradually converges until distortion occurs. FIG. 7 is schematic diagrams of 2D constellation obtained when A=0 (processing is not performed), 0.5, and 0.7. A continues to be increased to cause excessive distortion of the constellation diagram, constellation distribution is damaged, the BER increases rapidly, and the effect of correction cannot be achieved. As can be seen from FIG. 6, a signal with a higher ROP is more susceptible to excessive distortion, to cause an increase in the BER. When A=0.7, a BER of a PAM-4 signal with a ROP of −13 dBm already starts to deteriorate. To remove the impact of fluctuations in the BER caused by excessive distortion, in subsequent experiments, the amplitude modulation coefficient A used in S2DCD is 0.5.

FIG. 8 is histograms of a PAM-4 signal before and after S2DCD. It can be seen that 2D constellation distortion corrects the distribution of an original PAM signal to be more concentrated, thereby mitigating the impact of color noise in the system. To visually observe an improvement in signal distribution, a bias variance is introduced into parameter comparison of the histograms. When the bias variance is smaller, it indicates that the signal distribution is more concentrated, and a transmission effect is better. A specific formula is as follows:

$$S^2 = \frac{\sum_{i=1}^{n}(x_i - m_{x_i})^2}{n}, \quad (11)$$

where n is a data length, $x_i$ is an $i^{th}$ piece of data, and mx is a distribution center of an independent distribution interval of an optimal histogram in which the $i^{th}$ piece of data is located. In (a) of FIG. 8, a bias variance value of the PAM-4 signal is 0.1838. In (b) of FIG. 8, the bias variance value of the signal is 0.1124. An improvement in system performance brought by the inhibition of color noise can be visually observed.

B. Performance Comparison Between an NLDC-THP PAM-4 Signal and a C-PAM4 Signal In this part of experiment, the transmission performance of the system for a conventional PAM-4 (conventional PAM-4, C-PAM-4) signal and an NLDC-THP PAM-4 signal is compared. FIG. 9 shows curves of BERs of the C-PAM-4 signal and the NLDC-THP PAM-4 signal changing with a ROP in 31.25-GBd transmission over a 2-km SSMF. Obviously, at the same ROP, the BER of the NLDC-THP PAM-4 signal is lower than that of the C-PAM-4 signal. At −17 dBm, the NLDC-THP PAM-4 signal reaches an HD-FEC BER threshold (BER=3.8×10$^{-3}$). At the ROP of −20 dBm, a histogram and an eye pattern after decoding by two signal receiving ends are shown in FIG. 10.

A bias variance of a histogram in (a) of FIG. 10 is s2=0.2092, and a bias variance of a histogram in (c) of FIG. 10 is s2=0.2427. It can be seen from FIG. 10 that compared with the C-PAM-4 signal, the transmission performance of the NLDC-THP PAM-4 signal is greatly improved, the bias variance is reduced, and the signal distribution is more concentrated. In addition, after the NLDC-THP PAM-4 signal is decoded, the eye pattern has more distinct slicing phenomenon, and the opening amplitude of the eye pattern is obviously increased.

C. Performance Comparison Between THP and GTHP in an NLDC-(G)THP PAM-4 Signal System To mitigate nonlinear impact induced by a multi-level signal, the present invention converts a THP model into a more flexible GTHP model, and a more flexible LUT module is used in place of modular operation.

Under a GTHP condition, the level amplitude of an extended PAM-6 signal is flexibly adjusted to mitigate the impact of nonlinearity on a transmitted signal. The present invention studies transmission performance of an NLDC-THP PAM-4 signal and an NLDC-GTHP PAM-4 signal in a 31.25-GBd case. When a ROP is constantly −20 dBm, the level amplitude of a THP sending signal is (−7, −5, −3, −1, 1, 3, 5, 7), and the signal level amplitude of a GTHP sending signal is adjusted to (−7, −5, −2.85, −0.95, 0.95, 2.85, 5, 7), where ±7 is an extended extra-modular simulated level, and is used for designing a GTHP folding table and receiving end decoding. A histogram of a signal after decoding by a receiving end of an NLDC-GTHP PAM-4 system and a histogram of a received signal in a level set (that is, a THP level set) with uniform distances of conventional PAM-4 is shown in FIG. 11.

In (a) of FIG. 11, a bias variance of a histogram of an NLDC-THP PAM-4 decoding signal is 0.2029. In (b) of FIG. 11, a bias variance of a histogram of an NLDC-GTHP PAM-4 decoding signal is 0.1893. It can be seen that GTHP can improve the transmission performance of signals, and signal energy distribution is more concentrated, thereby helping to reduce nonlinear damage to signals. However, a nonlinear distortion phenomenon of the system has not been completely removed, and finer adjustment needs to be performed on a level set according to a specific demand of an experimental scenario.

In addition, the present invention compares BER performance of an NLDC-THP PAM-4 signal and an NLDC-GTHP PAM-4 signal at a rate of 62.5-Gb/s, as shown in FIG. 12. It can be seen that GTHP has improved the transmission performance of the system by reducing the nonlinear impact of the system. GTHP structurally only replaces a modular operation in THP with a LUT operation, adds no additional calculation and operation, has advantages such as a simple structure and a small circuit size, has complexity basically equal to THP, and in addition increases the flexibility of level allocation, which is a more appropriate pre-equalization selection in the system.

In addition, FIG. 13 shows the impact of different equalization algorithms on bit error rate performance of an NLDC-GTHP PAM-4 signal, a C-PAM-4 signal, and a GTHP PAM-4 signal.

In FIG. 13, the receiving end respectively uses an FFE equalization method and a VE equalization method. As shown in FIG. 13, compared with a conventional GTHP system, for a GTHP system in which partial response coding is added, when FFE (tap=60) and VE (tap=60/8/1) are equalized at the receiving end, there is a performance improvement of approximately 1 dB at an HD-FEC bit error rate threshold. Compared with FFE linear equalization, after VE nonlinear equalization is used, the overall performance of the system has obtained an improvement of approximately 2-dB. After NLDC-GTHP is used, system performance is further improved.

D. Performance Improvement of 2D Constellation Distortion

In the NLDC-GTHP PAM-4 system, a signal before decoding by the receiving end is a six-level signal. Due to the correlation of a partial response coding sequence, 2D constellation points of the signal fails to fill a 6*6 constellation diagram, but an obvious invalid constellation area appears, as shown in (a) of FIG. 14. An increase in the quantity of constellation points and the simplification of the system cause certain errors in both a convergence angle and amplitude of constellation points during constellation distortion processing. Therefore, overcorrection or insufficient correction occurs. As a result, constellation points may be deviated into an invalid region of the constellation diagram, and a large number of bit errors occur during decoding. Therefore, in the present invention, one LUT module is added to an S2DCD module, to correct points that are deviated into the invalid region. A final correction effect is shown in (b) of FIG. 14.

FIG. 15 is curve graphs of bit error rates of respective tests when color noise processing is not added, complex 2D constellation distortion processing is used, and S2DCD processing respectively testing in the NLDC-GTHP PAM-4 system. It can be seen that, simplified processing of 2D constellation distortion causes slight improvement rather than deterioration in BER performance. The reason of this is shown in FIG. 6 and FIG. 7 above. The optimized value of the amplitude modulation coefficient A and the fixation of other noise parameters causes excessive shaping in a part of processed constellation points, and a local micro-distortion phenomenon of the constellation diagram make a constellation cloud tend to converge, thereby improving the bit error rate performance of the system. To avoid a rapid increase in the BER caused by overall excessive distortion, the complex 2D constellation distortion processing completely eliminates local micro-distortion, but instead restricts the BER performance to a certain extent. An S2DCD processing module can eliminate color noise in the system. A DD-FTN algorithm is one of the most significant algorithms that eliminates a color noise effect, in which ISI is introduced while a low-pass filter is added after an equalizer to eliminate color noise, and then introduced ISI is reduced by using a maximum likelihood sequence detection algorithm. Due to the high complexity of a maximum likelihood detection algorithm part in a DD-FTN structure, it is difficult to implement a DD-FTN algorithm in actual application, and therefore the algorithm is used as a contrast herein. A blue curve shown in FIG. 16 is an improvement in the bit error rate performance of the system brought by the DD-FTN structure.

FIG. 16 is respectively system curve graphs of bit error rates of three transmission systems under the impact of S2DCD and DD-FTN in the case of 31.25-GBd. It can be seen that DD-FTN is an optimal denoising algorithm, followed by simplified 2D distortion. In consideration of a complexity requirement, S2DCD can improve overall performance while keeping low complexity, and implements a performance improvement of 2-dB at an HD-FEC bit error rate threshold in the NLDC-GTHP PAM-4 system.

For a back-end denoising optimization module of the foregoing equalizer, the complexity is determined by a quantity of multiplications required for processing every symbol, and may be simply denoted by a quantity of multiplicators during operation. In the DD-FTN structure, in addition to a back filter, the multiplication complexity of DD-FTN mainly comes from the calculation of path measurement in a Viterbi of the DD-FTN, and a forward recursion function $\alpha k(s)$ of the DD-FTN is:

$$\alpha_k(s) = \sum_{s'} \alpha_{k-1}(s') \cdot \gamma_k(s', s), \quad (12)$$

where s' and s respectively represent states at a $(k-1)^{th}$ moment and a $k^{th}$ moment in a state conversion chart, $\alpha_{k-1}(s')$ is a forward probability, and $\gamma_k(s', s)$ is a branch transfer probability and is determined by channel information. If a memory length of the DD-FTN is indicated as L−1 and a format of a processing signal is PAM-M, the complexity $C_{DD-FTN}$ of DD-FTN may be denoted as:

$$C_{DD-FTN} = M^{2L} \quad (13).$$

Therefore, the complexity increases exponentially as the memory length increases. The complexity $C_{2DCC}$ of non-S2DCD may be denoted as:

$$C_{2DCC} = 18 \cdot 2^M \quad (14),$$

where the complexity is not related to the memory length, and only depends on a modulation format. The complexity $C_{S2DCC}$ of the S2DCD may be denoted as:

$$C_{S2DCC} = 4 \cdot 2^M \quad (15).$$

The complexity is also not related to the memory length. In addition, the quantity of multiplicators is reduced by approximately 78% compared with that before simplification. In this experiment, a signal before decoding on which denoising optimization is to be performed is a six-level signal, that is, M=6. Assuming that DD-FTN uses a single memory length channel (that is, L−1=1), the theoretical complexity and the complexity in this experiment may be denoted by a quantity of multiplicators, as shown in Table 1. Table 1 shows comparison of calculation complexity of DD-FTN, 2DCC, and S2DCC.

TABLE 1

|  | DD-FTN | 2DCC | S2DCC |
| --- | --- | --- | --- |
| Theoretical complexity | $M^{2L}$ | $18 \cdot 2^M$ | $4 \cdot 2^M$ |
| Complexity set in an experiment | ≥1296 | 1152 | 256 |

An IM/DD PAM-4 signal is usually used in an optical interconnect system in a short-range bandwidth-limited system. The present invention proposes and experimentally verifies a partial response NLDC-GTHP PAM-4 system. Compared with a conventional PAM-4 system, at a transmitting end, in the present invention, in one aspect, a distance between symbol levels is adjusted by using GTHP to flexibly counteract inter-code interference. In another aspect, NLDC is used to counteract high-frequency roll-off of a low bandwidth device, and at the same time an as small as possible quantity of levels is kept, to counteract nonlinear damage of a bandwidth-limited system. At a receiving end, after equalization, a denoising module is usually used to mitigate the enhancement of color noise. However, a common denoising module has a complex DD-FTN structure, and is not applicable to a low-cost short-range bandwidth-limited system. Therefore, in the present invention, the impact of color noise is mitigated by using S2DCD, the algorithm is simpler, and an optimal effect can be achieved without complex nonlinear equalization. Compared with a system without a denoising module, in an environment of transmission over 2-kilometer SSMF, for S2DCD, receiver sensitivity can be improved by 2-dB at an HD-FEC BER threshold. Therefore, the NLDC-GTHP PAM-4 system proposed in the present invention has excellent performance and low complexity, and has wide application prospect in short-range high-speed optical interconnect systems.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction device. The instruction device implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. An optical interconnect system for a data center, comprising:
   a nonlinear differential precoding module, wherein the nonlinear differential precoding module performs nonlinear differential precoding on an inputted original signal, to obtain a precoded signal with an increased quantity of levels;
   a generalized Tomlinson-Harashima precoding (GTHP) module, wherein THP in the GTHP module is a single-tap simplified model, and the GTHP module pre-equalizes the precoded signal with an increased quantity of levels, to obtain a pre-equalized signal with scattered distribution;
   a faster than Nyquist (FTN) module, wherein the FTN module performs high-frequency truncation filtering on the pre-equalized signal with scattered distribution, to obtain a discrete signal;
   a signal transmission module, wherein the signal transmission module transmits the discrete signal from a transmitting end to a receiving end;
   a feed-forward equalizer (FFE), wherein the FFE performs strong equalization on the discrete signal to obtain a level slice signal, and decodes the level slice signal according to a GTHP decoding table, to obtain a decoded signal; and
   a simplified 2D constellation distortion (S2DCD) module, wherein the S2DCD module processes the decoded signal to reshape a constellation, and obtains a restored signal according to a time interleaving method, wherein the S2DCD module discards a noise parameter for which calculation requires participation of a feedback decision signal, and reserves an amplitude modulation parameter,
   wherein the nonlinear differential precoding module, the GTHP module, and the FTN module are disposed at the transmitting end, and the FFE and the S2DCD module are disposed at the receiving end.

2. The optical interconnect system for a data center according to claim 1, wherein a coding scheme of the nonlinear differential precoding module comprises:

$$\tilde{u}_n = \mathrm{mod}[u_n - \mathrm{floor}(\alpha v_{n-1}), m]$$

$$v_n = \tilde{u}_n + \mathrm{floor}(\alpha v_{n-1})$$

$$u_n = \mathrm{mod}(v_n, m)$$

wherein $u_n$ is an $n^{th}$ PAM-m symbol, $u_n \in \{0, 1, \ldots, m-1\}$, $\tilde{u}_n$ is an $n^{th}$ precoding symbol, $\tilde{u}_n \in \{0, 1, \ldots, m-1\}$, $v_n$ is an nth coding symbol, $v_n \in \{0, 1, \ldots, m-1\}$, a parameter $\alpha$ is a cutoff coefficient with a value ranging from 0 to 1, m and M are respectively level series of a PAM-m symbol before coding and a PAM-M symbol after coding, and Floor(·) is a rounding down function; and a power spectral density of a transfer function is:

$$S(\omega) = \frac{(1-\alpha)^2}{1+\alpha^2 - 2\alpha \cos \omega T}.$$

3. The optical interconnect system for a data center according to claim 1, wherein the GTHP module performs nonlinear transform according to a look-up table (LUT), comprising:
   determining an output $s_n$ of the LUT by current values of $x_n$ and $u_n$, wherein $u_n$ is a sum of $x_n$ and an output feedback signal, and $x_n$ is an inputted PAM-M sequence; and
   adding the output $s_n$ of the LUT and $u_n$ to fold an out-of-range signal.

4. The optical interconnect system for a data center according to claim 1, wherein the S2DCD module performs data processing based on the following method:
   calculating a spatial relative offset of every 2D constellation point by using a predefined 2D function F(x, y) for use in subsequent constellation shaping:

$$F(x, y) = \sum_{i=1}^{N} Ae^{-\frac{((x-\mu_{xi}-\sigma_x^2)\sin\theta_i - (y-\mu_{yi}+\sigma_y^2)\cos\theta_i)^2}{2\sigma_y^2}} e^{-\frac{((y-\mu_{yi}+\sigma_y^2)\sin\theta_i + (x-\mu_{xi}-\sigma_x^2)\cos\theta_i)^2}{2\sigma_x^2}} - Ae^{-\frac{((x-\mu_{xi}-\sigma_x^2)\sin\theta_i - (y-\mu_{yi}+\sigma_y^2)\cos\theta_i)^2}{2\sigma_y^2}} e^{-\frac{((y-\mu_{yi}+\sigma_y^2)\sin\theta_i + (x-\mu_{xi}-\sigma_x^2)\cos\theta_i)^2}{2\sigma_x^2}},$$

wherein N is a quantity of 2D constellation points, $N=2^M$ in a PAM-M signal, A denotes an amplitude of every 2D Gaussian distribution, $\mu_{xi}$ and $\mu_{yi}$ are a real part and an imaginary part of an $i^{th}$ constellation point, $\sigma_x^2$ and $\sigma_y^2$ are respectively variances of noise distribution along a real axis and an imaginary axis, and $\theta_i$ is a tilt angle of a first cluster of a received signal relative to a real axis of an IQ plane, and is approximated by using $\theta_i \approx \tan^{-1}(\sigma_{yi}^2/\sigma_{xi}^2)$;

discarding the noise parameter for which calculation requires participation of a feedback decision signal, and reserving an amplitude modulation parameter A, to obtain a simplified formula:

$$F(x, y) = \sum_{i=1}^{N} Ae^{-\frac{(y-\mu_{yi}+x-\mu_{xi})^2}{2}} \left( e^{-\frac{(x-\mu_{xi}-y-\mu_{yi}-1)^2}{2}} - e^{-\frac{(x-\mu_{xi}-y-\mu_{yi}+1)^2}{2}} \right),$$

wherein an output R'[n] after 2D constellation distortion is:

$$R'[n]=R[n]-F(x_n,y_n)+F(x_n,y_n)\cdot j;\text{ and}$$

restoring an original PAM-M signal according to the time interleaving method.

5. The optical interconnect system for a data center according to claim 1, further comprising:
   a bit error ratio (BER) calculation module, wherein the BER calculation module compares the obtained restored signal with the original signal, to obtain a BER.

6. The optical interconnect system for a data center according to claim 1, wherein each of the transmitting end and the receiving end is provided with an offline digital signal processing (DSP) module.

7. The optical interconnect system for a data center according to claim 1, wherein the signal transmission module comprises a fiber channel.

8. The optical interconnect system for a data center according to claim 1, wherein the system is an optical interconnect system for a data center based on partial response THP high-speed data PAM-4.

9. An optical interconnect method, implemented based on the optical interconnect system for a data center according to claim 1.

10. The optical interconnect method according to claim 9, wherein an input signal of the nonlinear differential precoding module is PAM-4 data, and an output signal of the nonlinear differential precoding module is PAM-6 data.

* * * * *